United States Patent
Byrne

(10) Patent No.: US 11,388,283 B2
(45) Date of Patent: Jul. 12, 2022

(54) METHOD AND APPARATUS FOR GENERATING RECORDS FROM COMMUNICATION DATA

(71) Applicant: FinancialForce.com, Inc., San Francisco, CA (US)

(72) Inventor: Matthew James Byrne, Harrogate (GB)

(73) Assignee: FinancialForce.com, Inc., San Francisco, CA (US)

(*) Notice: Subject to any disclaimer, the term of this patent is extended or adjusted under 35 U.S.C. 154(b) by 0 days.

(21) Appl. No.: 16/952,033

(22) Filed: Nov. 18, 2020

(65) Prior Publication Data

US 2021/0152688 A1 May 20, 2021

Related U.S. Application Data

(63) Continuation of application No. 16/801,845, filed on Feb. 26, 2020, now Pat. No. 10,880,429, which is a continuation of application No. 15/853,265, filed on Dec. 22, 2017, now Pat. No. 10,616,402.

(51) Int. Cl.
| | |
|---|---|
| G06Q 10/10 | (2012.01) |
| G06Q 30/00 | (2012.01) |
| H04L 67/53 | (2022.01) |
| H04M 3/22 | (2006.01) |
| H04L 67/02 | (2022.01) |

(52) U.S. Cl.
CPC ........ *H04M 3/2218* (2013.01); *G06Q 10/103* (2013.01); *G06Q 30/01* (2013.01); *H04L 67/02* (2013.01); *G06Q 10/1091* (2013.01); *H04M 2203/556* (2013.01)

(58) Field of Classification Search
CPC .......... H04M 3/2218; H04M 2203/556; G06Q 10/103; G06Q 30/01; G06Q 10/1091; H04L 67/02; H04L 67/20
See application file for complete search history.

(56) References Cited

U.S. PATENT DOCUMENTS

| | | | | |
|---|---|---|---|---|
| 10,169,035 B1 * | 1/2019 | Caspi | ........................ | G06F 8/73 |
| 10,616,402 B2 | 4/2020 | Byrne | | |
| 10,880,429 B2 | 12/2020 | Byrne | | |
| 2004/0186763 A1 * | 9/2004 | Smith | .................. | G06Q 50/165 |
| | | | | 705/315 |

(Continued)

FOREIGN PATENT DOCUMENTS

| | | | | |
|---|---|---|---|---|
| DK | 2019-07085 | * | 2/2019 | .............. H04M 3/22 |

OTHER PUBLICATIONS

Dean, Jr., Joseph E., Non-Final Office Action dated Mar. 20, 2020 for U.S. Appl. No. 16/801,845.

(Continued)

*Primary Examiner* — Joseph E Dean, Jr.
(74) *Attorney, Agent, or Firm* — Kokka & Backus, PC

(57) ABSTRACT

Various embodiments concern obtaining communication data and generating activity logs. More specifically, communication data such as contact information and call time associated with communications are obtained. The obtained data is then used to generate a report including the time, duration, and project or client associated with communication. Thus, an activity log is automatically generated using the communication data.

20 Claims, 7 Drawing Sheets

(56) References Cited

U.S. PATENT DOCUMENTS

| | | | |
|---|---|---|---|
| 2008/0114683 A1* | 5/2008 | Neveu | G06Q 10/1091 705/50 |
| 2014/0344119 A1 | 11/2014 | Haines | |
| 2015/0094097 A1 | 4/2015 | Fraccaroli | |
| 2017/0206454 A1 | 7/2017 | Jihn | |
| 2019/0199852 A1 | 6/2019 | Byrne | |
| 2020/0195774 A1 | 6/2020 | Byrne | |

OTHER PUBLICATIONS

Dean, Jr., Joseph E., Notice of Allowance and Fee(s) Due dated Aug. 25, 2020 for U.S. Appl. No. 16/801,845.

Dean, Jr., Joseph E., Notice of Allowance and Fee(s) Due dated Jan. 10, 2020 for U.S. Appl. No. 15/853,265.

\* cited by examiner

METHOD AND APPARATUS FOR GENERATING RECORDS FROM COMMUNICATION DATA

CROSS-REFERENCE TO RELATED APPLICATIONS

This nonprovisional application is a continuation application of U.S. patent application Ser. No. 16/801,845, filed Feb. 26, 2020, and entitled "METHOD AND APPARATUS FOR GENERATING RECORDS FROM COMMUNICATION DATA;" U.S. patent application Ser. No. 16/801,845 is a continuation of U.S. patent application Ser. No. 15/853,265 entitled "USING CALL DATA TO LOG ACTIVITIES AND GENERATE ACTIVITY RECORDS" and filed Dec. 22, 2017, which is now U.S. Pat. No. 10,616,402, issued on Apr. 7, 2020, all of which are herein incorporated by reference for all purposes.

FIELD

The invention relates to data gathering and processing. The invention more particularly relates to obtaining call data indicating call information to generate activity records.

BACKGROUND

Activity logs allow individuals and corporations to record call activities data such as the time, duration, and parties associated with the call. This information is useful for keeping record of call activities, generating reports for accounting purposes, evaluating the time expended on a task or project, and ensuring that calls are performed on schedule.

Activity logs generally rely on manual input by a user or employee. For example, a person may keep a log indicating when the person called or received a call. The person would need to remember the call time and telephone number called or received. The person may then manually calculate the time that elapsed during the call. The person may also use an electronic device for inputting the call data associated with a telephone call. For instance, the person may use a spreadsheet on a computer or accounting software to manually enter the call data.

Manual data entry tasks encounter several problems. For instance, data entry is a tedious and time-consuming task that interrupts a user from their activity or task. Additionally, data entry relies on the ability of the user to accurately remember and input the data. In some instances, a user does not enter activities when they occur and then must recall the activities later. Additionally, there may be typos and other errors that reduce the accuracy of manually entered data. These issues can cause significant problems, particularly for employees who face deadlines and other time constraints when performing activities and tasks at different work sites or project locations.

SUMMARY

An apparatus and method for obtaining call data and generating activity logs are described herein. The method may be performed by a processor and includes the step of obtaining call contact data, call time data, and call duration data. The method further includes the step of creating a first record including the call contact data, call time data, and call duration data. Additional steps include accessing project data including a project identifier and a project contact data, associating the first record with the project data by matching the call contact data of the first record with the project contact data of the project data, creating a second record including the call duration data and project identifier, generating an invoice entry based on the second record and indicating the duration of the call and the project associated with the call, and transmitting the invoice entry to a user associated with the telephone call.

The apparatus for obtaining call data and generating activity logs using the obtained call data includes a processor and a memory that includes instructions. When executed by the processor, the instructions cause the processor to obtain call contact data, call time data, and call duration data, create a first record including the call contact data, call time data, and call duration data, access project data including a project identifier and a project contact data, associate the first record with the project data by matching the call contact data of the first record with the project contact data of the project data, create a second record including the call duration data and project identifier, generate an invoice entry based on the second record and indicating the duration of the call and the project associated with the call, and transmit the invoice entry to a user associated with the telephone call.

DETAILED DESCRIPTION

Cloud platforms such as a Software-as-a-Service ("SaaS") platform and the SALESFORCE platform allow for sharing processing resources and data in a multi-tenant network that offers computing services on demand to customers. More generally, cloud computing enables ubiquitous, on-demand access to a shared pool of configurable computing resources, e.g. networks, servers, storage, applications, and services, which can be rapidly provisioned and released with minimal management effort. Specifically, a SaaS platform or a SALESFORCE™ platform may provide numerous companies with an interface for case management and task management, and a system for automatically routing and escalating events.

Systems and techniques for accessing an external service and external data are described herein. For example, systems and techniques are described for accessing telephone service data using the Google Android™ telephony services API (also referred to herein as "Google telephony services") or the Apple™ telephony services API (also referred to herein as "Apple telephony services"). The Google™ and Apple™ telephony services API provide call party identification information, time associated with a call, and data indicating the duration of the call. For example, an API call could initially be made to the Google telephony services API that causes external data to be read and/or fetched or otherwise obtained from a telephony device. Alternatively, an API call could be made to one or more other APIs that provide access to the raw data managed by the Google telephony services. In some embodiments, custom adapters, e.g. Lightning Connect, for the SALESFORCE platform to facilitate the systems and techniques for accessing an external service and external data. Additionally, data records may be created using various SaaS APIs. In one embodiment, records may be created on a SALESFORCE server using SALESFORCE APIs.

Systems and techniques for providing a GUI that organizes and displays call data are described herein. The GUI may be hosted on a SaaS platform and may be a SALESFORCE interface providing access to a SALESFORCE service. Note that the term "SALESFORCE interface" is intended to cover any interface that allows a user to access a SALESFORCE environment. For example, a SALESFORCE interface could be a customer portal associated with SALESFORCE itself, or an interface associated with an add-on application to the SALESFORCE platform, e.g. a FinancialForce portal. The SALESFORCE interface could also be accessed via a SALESFORCE mobile application, enabled by the SALESFORCE Lightning Experience, etc.

Figure 1:
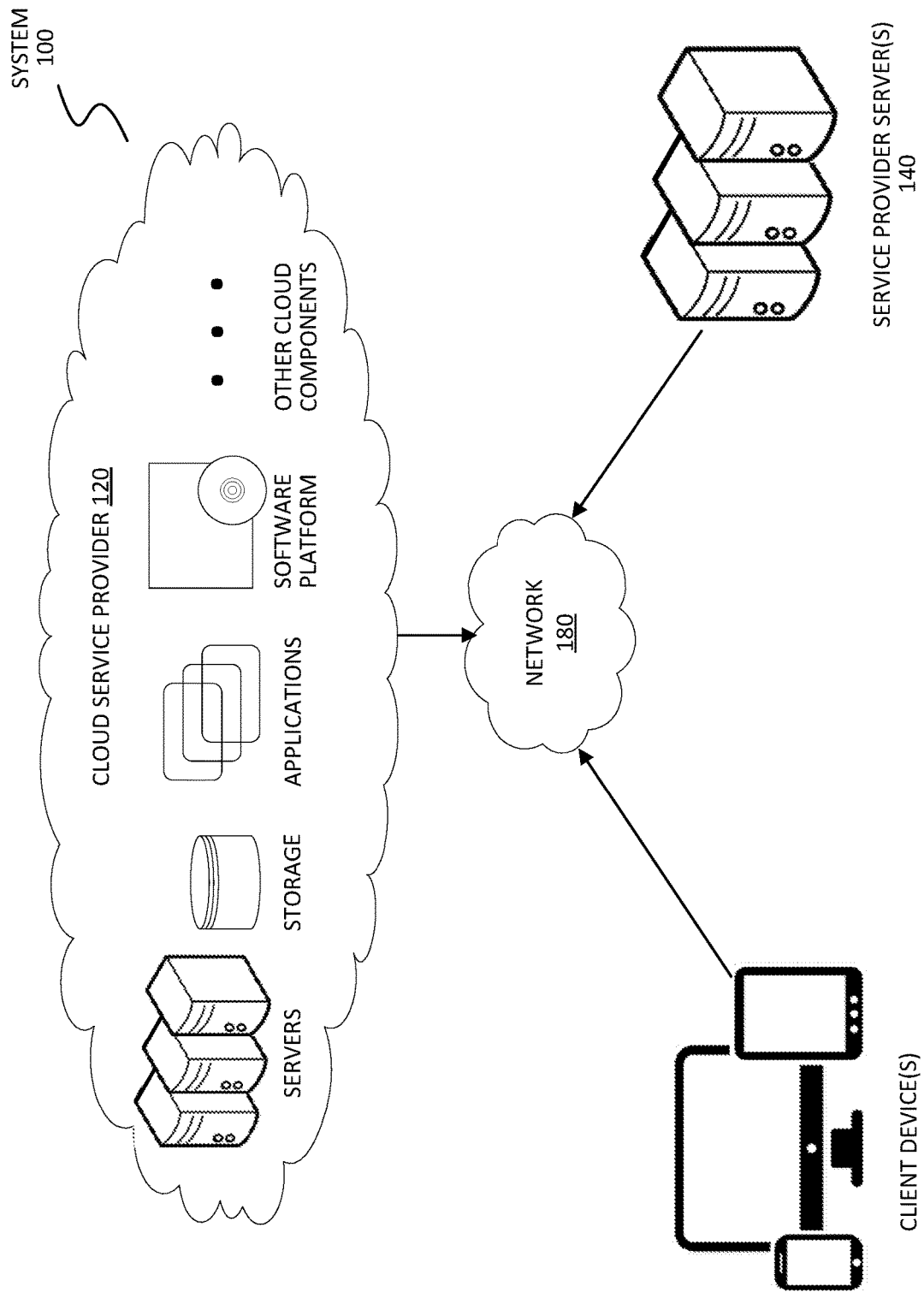
FIG. 1 depicts a high-level view of a network in which call data may be obtained and activity logs generated.

FIG. 1 is a block diagram of a system 100 that implements the disclosed process for utilizing telephony services data according to some embodiments of the invention. System 100 includes components such as a cloud platform 120, e.g. the SALESFORCE platform, one or more service provider servers 140 that use cloud based services to provide add-on applications, and one or more client devices 160 that use the add-on applications, all of which are interconnected over a network 180.

The network 180 may include any combination of private, public, wired, or wireless portions. Data communicated over the network 180 may be encrypted or unencrypted at various locations or along different portions of the network 180. Each component of the system 100 may include combinations of hardware and/or software to process data, perform functions, communicate over the network 180, and the like. For example, any component of the system 100 may include a processor, memory or storage, a network transceiver, a display, an operating system, and application software, e.g. for providing a user portal, and the like. Other components, hardware, and/or software included in the system 100 are well known to persons skilled in the art and, as such, are not shown or discussed herein.

The cloud platform 120 can provide access to a shared pool of configurable computing resources including servers, storage, applications, software platform, networks, services, and the like accessed by the service provider servers 140 to offer add-on applications to client devices 160. The SALESFORCE platform, e.g. the cloud service provider 120, supports multiple tenants and is commonly referred to as a platform as a service (PaaS).

The PaaS is provided to developers for creating the add-on applications that run on the components of the cloud service provider 120. Force.com is an example of a PaaS that hosts applications hosted on Salesforce.com, which is an example of a cloud platform. For example, add-on applications can provide subscription billing services to users using the client devices 160. The subscription billing services are provided by the service provider servers 140 and include applications built on the software platform of the cloud platform 120.

The service provider servers 140 may include any number of server computers that provide the add-on applications such as project management or customer management services. These services provide data associated with a project or customer. Data may include identification information, physical location information, and telephone number information associated with the project or customer. Although shown separately from the cloud platform 120, the service provider servers 140 may be included as part of the cloud platform 120.

The service provider servers 140 may provide or administer a user interface, e.g. website, accessible from the client devices 160. The user interface may include features such as dashboard analytics to provide insight into how a business is performing. Examples of businesses that could benefit from subscription billing services range from SaaS (Software as a Service) providers to energy and utilities companies.

The add-on applications provided by the service provider servers 14 are built using a particular programming language. For example, Force.com applications are built using Apex (a proprietary Java-like programming language for Force.com) and Visualforce (an XML syntax typically used to generate HTML). The code used to build applications may include functions that are accessible by the add-on applications.

Figure 2:
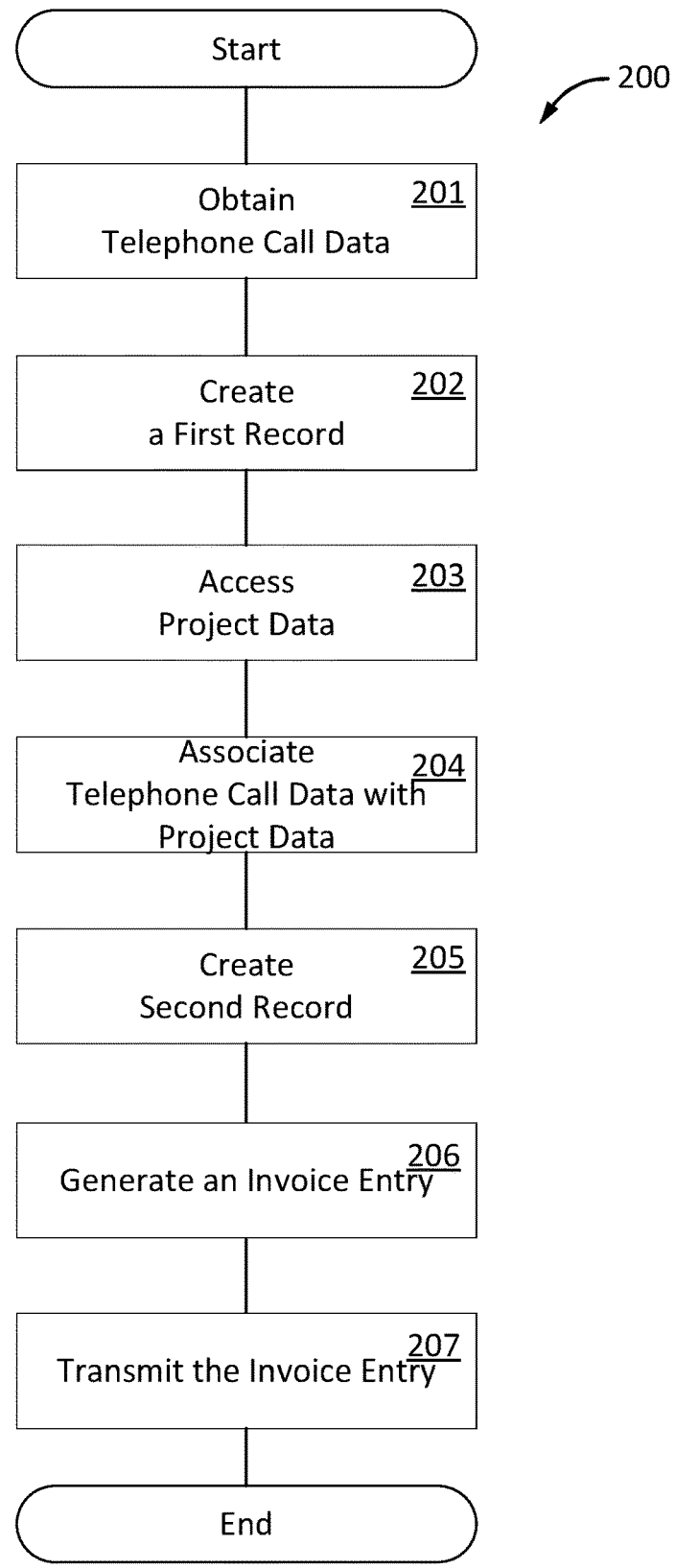
FIG. 2 depicts a process for obtaining call data and generating activity logs.

FIG. 2 is a flowchart illustrating a process 200 performed on a processor that obtains call data and generates records associated with the call data according to some embodiments of the invention. The telephone call may be a call between a telephone device and a third-party device. The processor may be implemented as part of a server, e.g. cloud based server 120, or in any location that facilitates the operation of a processor. In step 201, the processor obtains call contact data identifying a third-party telephony device in communication with the processor. In some embodiments, the data may indicate the call time and call duration. Additionally, the processor may obtain user data that identifies a user using the telephone call. The call contact data and/or user data may be a telephone number, user name, or any other information used to identify the parties and establish the call. In some embodiments, the telephone call may occur over a circuit switched network. In other embodiments, the telephone call may occur over a digital network. For example, the call may occur over a Voice over IP (VoIP) network. Further, the call may occur over a wired or wireless connection.

In step 202, the processor creates a first record containing data derived from the call data for storage. The first record may be stored at a server for future access, updates, or modification. In some embodiments, the call data may be stored in cloud service provider 120. In some embodiments, the call data may be stored as a record in a Software-as-a-Service (SaaS) server or SALESFORCE server. Additionally, the first record may be created using a SaaS API or specifically a SALESFORCE API. The data may indicate the call time, duration, and the call contact information associated with a call. In some embodiments, the data may also include user data indicating the user or employee assigned to the telephony device. The call contact data and/or user data may be a telephone number, user name, or any other information used to identify the parties and establish the call.

Systems and techniques for creating a record to store the call data may use a formatting module for parsing the call data and formatting some or all the call data so that it conforms to the format of the record. For example, the formatting module could reformat or filter the call data before it is mapped to the fields of the stored record. In one embodiment, the formatting module can modify the data structure of dates, times, and telephone numbers, etc., so that the data can be properly identified by the SaaS or SALESFORCE platform. The formatting module can also establish a lookup relationship by mapping the call data to one or more data fields of a record. In some embodiments, the mapping is dynamically performed based on the content of the call data.

In step 203, the processor accesses project data. The project data may be accessed from a server storing project data. In some embodiments, the project data may be accessed from service provider servers 140. Service provider servers 140 may be located remotely from cloud service provider 120 or may be integrated with cloud service provider 120. The project data may include identification information indicative of a project and the contact information associated with the project. The project contact information may be a telephone number, user name, or any other information used to identify the parties and establish the call. In some embodiments, the project may correspond to client or project worksite. In some examples, the identification information may be a telephone number used to reach the project operator or worksite operator.

In step 204, the processor associates the project data accessed at step 203 with the call data stored in a record at step 202. In some embodiments, the association is performed by matching the project contact data with the call contact data associated with the third-party telephone device. The record created and stored at step 202 may also include user data, e.g. data for indicating the employee using or assigned to use the telephony device. By associating the employee data with the matching call contact data and project contact data, the processor can determine the project or client the user was engaged with during the call. One having ordinary skill in the art will understand that various call data such as information indicating a time, location, and telephone call identification may be associated with the various project data information.

In step 205, the processor creates a second record using the data associated at step 204. The second record may include information indicative of the user associated with telephony device, the time that a call is initiated and completed, and the client or project associated with the incoming or outgoing call. Additionally, the record may include the duration of the call by calculating the time that has elapsed between when the call is initiated and completed. Therefore, the second record includes information showing the time when an employee is on a telephone call associated with a project or client. In some embodiments, the call data may be stored as a record in a Software-as-a-Service (SaaS) server or SALESFORCE server. Additionally, the record may be created using a SaaS API or specifically a SALESFORCE API.

In step 206, the processor may generate an invoice entry based on the second record. In some embodiments, an entry may be represented as a row in the Time Card GUI 600 of FIG. 6. The record may be used as an invoice entry for recording the amount of time an employee works on a project or at a worksite. One having ordinary skill in the art will understand that various other uses may arise from the data gathered in process 200 such as for timekeeping, accounting, or project management purposes In step 207, the processor may transmit the invoice entry for display, review, or editing. For example, the invoice entry may be presented as data on Time Card GUI 600 of FIG. 6. The invoice entry may be transmitted to a user that had been a party to the telephone call. In one example, the user is connected to a call with a party on a third-party device. The user may be rendering services such as technical support or consulting via the telephone call to the party on the third-party device. In this example, the invoice entry will include the duration of the call and the party or client associated with the third-party device. The user may review this information and make any necessary revisions. Additionally, the invoice entry may be transmitted to the party on the third-party device for billing purposes.

Figure 3:
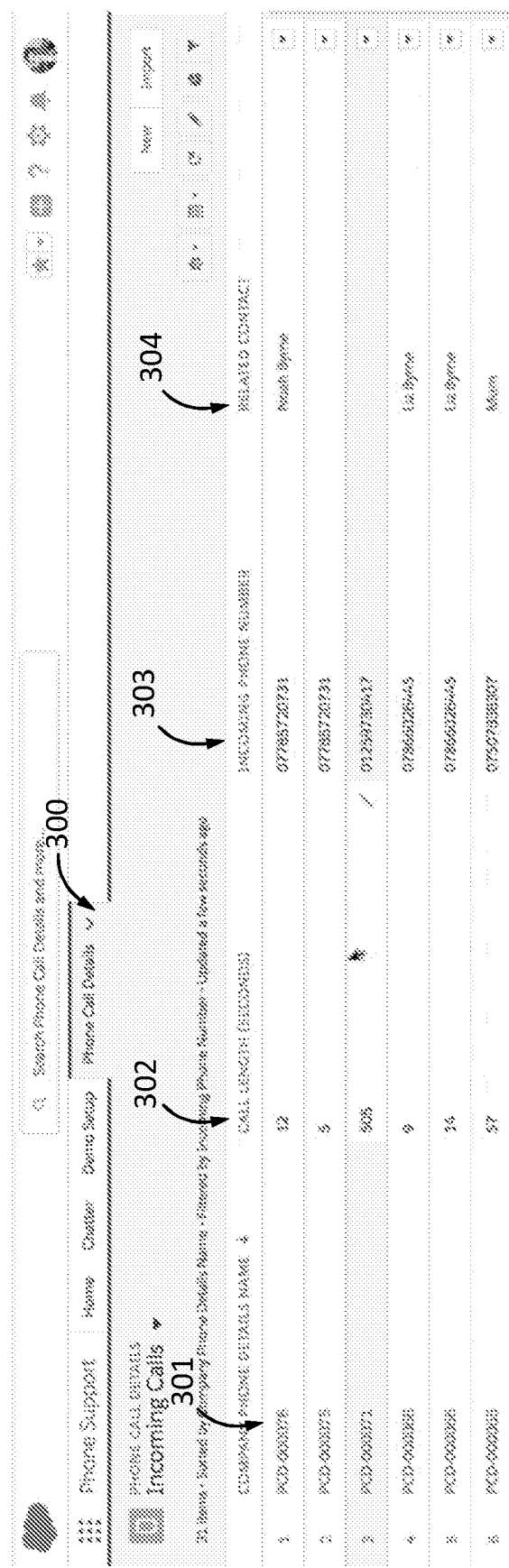
FIG. 3 depicts a graphical user interface (GUI) that displays data and facilitates obtaining call data and generating activity logs.
Figure 4:
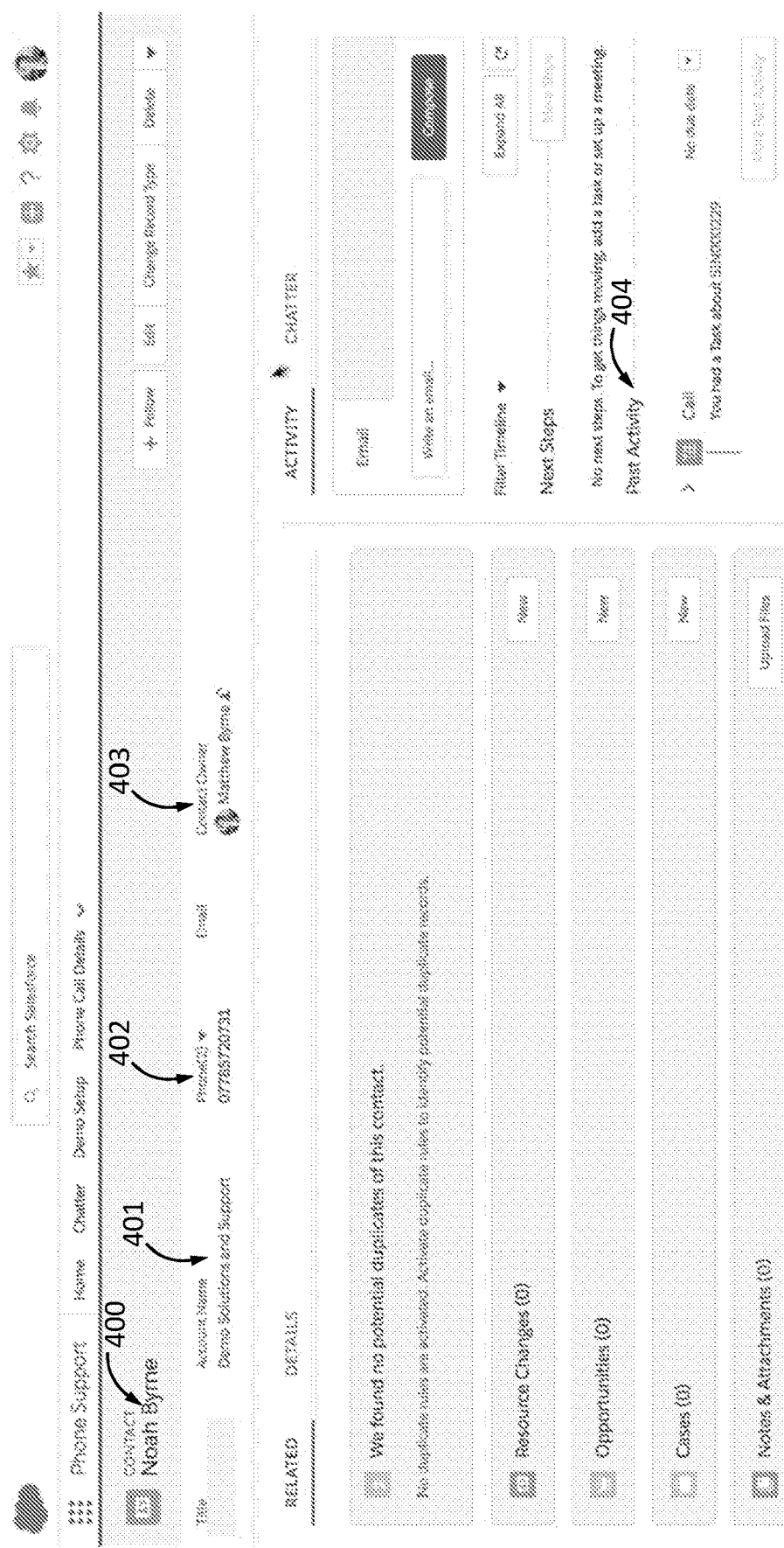
FIG. 4 depicts a GUI that displays data and facilitates obtaining call data and generating activity logs.

FIG. 3 is a GUI that facilitates the process that obtains call data and generates records associated with the call data according to some embodiments of the invention. The GUI may be run by a processor on a cloud-based server. In one embodiment, the Phone Call interface 300 of the GUI provides information regarding the time and telephone number of a call. The information is sorted into entries represented by rows. For instance, a first entry 301 occupies a first row of the interface. Each entry includes data fields including a call length field 302, incoming phone number field 303, and related contact field 304. For instance, entry 301, i.e. row 1, includes a call length field 302 indicating that the call lasted "12" seconds, an incoming phone number field 303 that identifies "07785720731," and related contact field 304 that indicates the related contact. One having ordinary skill in the art will understand that various other fields may be displayed in the interface to present call data FIG. 4 is a GUI that facilitates the process that obtains call data and generates records associated with the call data according to some embodiments of the invention. The GUI may be run by a processor on a cloud-based server. In one embodiment, contacts interface 400 of the GUI provides information regarding a contact. The contacts interface 400 includes an account name field 401, phone number field 402, contact owner field 403, and past activities field 404. One having ordinary skill in the art will understand that the entries may be arranged and re-arranged in different formats.

Figure 5:
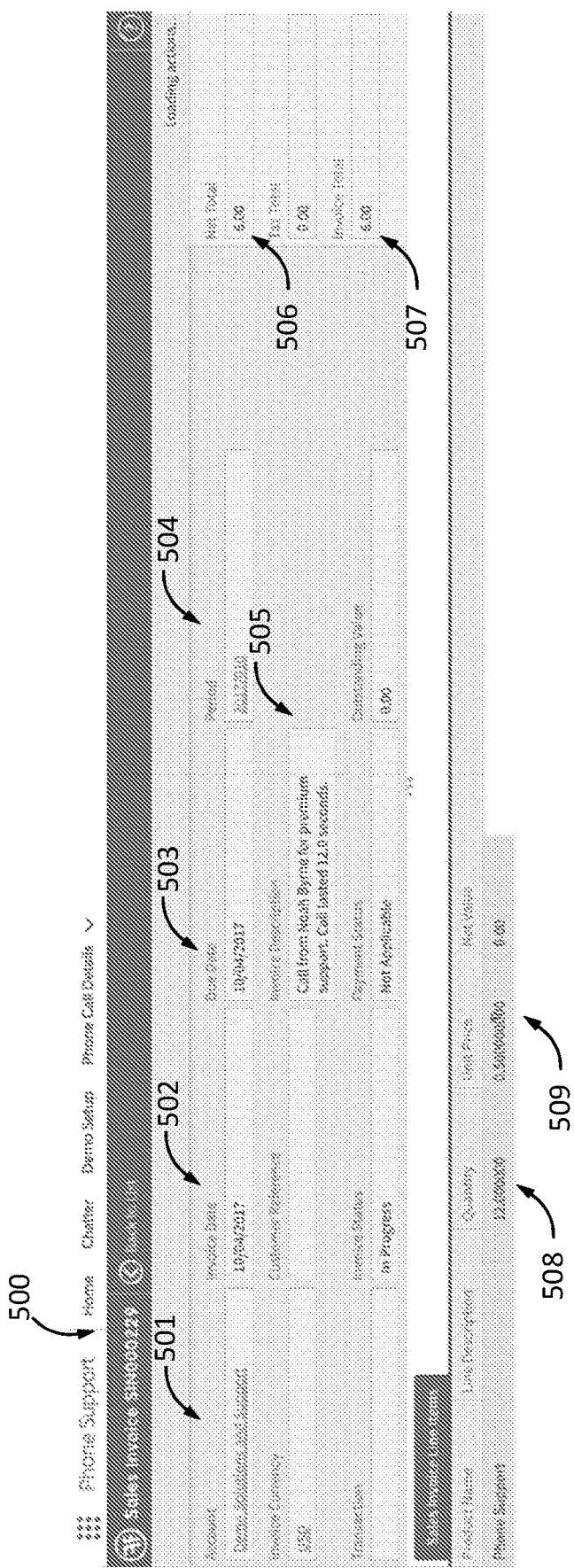
FIG. 5 depicts a GUI that displays data and facilitates obtaining call data and generating activity logs.

FIG. 5 is a GUI that facilitates the process that obtains call data and generates records associated with the call data according to some embodiments of the invention. The GUI may be run by a processor on a cloud-based server. In one embodiment, Sales Invoice Interface 500 of the GUI provides information regarding an invoice corresponding to a call. The Sales Invoice Interface 500 include an account field 501, invoice date field 502, due date field 503, period field 504, invoice description field 505, net total field 506, invoice total field 507, line item quantity field 508, and line item unit price field 509. One having ordinary skill in the art will understand that the information presented in the GUI may be configured to take different forms. For instance, project status information may be a separate field or part of the invoice description field 505.

Figure 6:
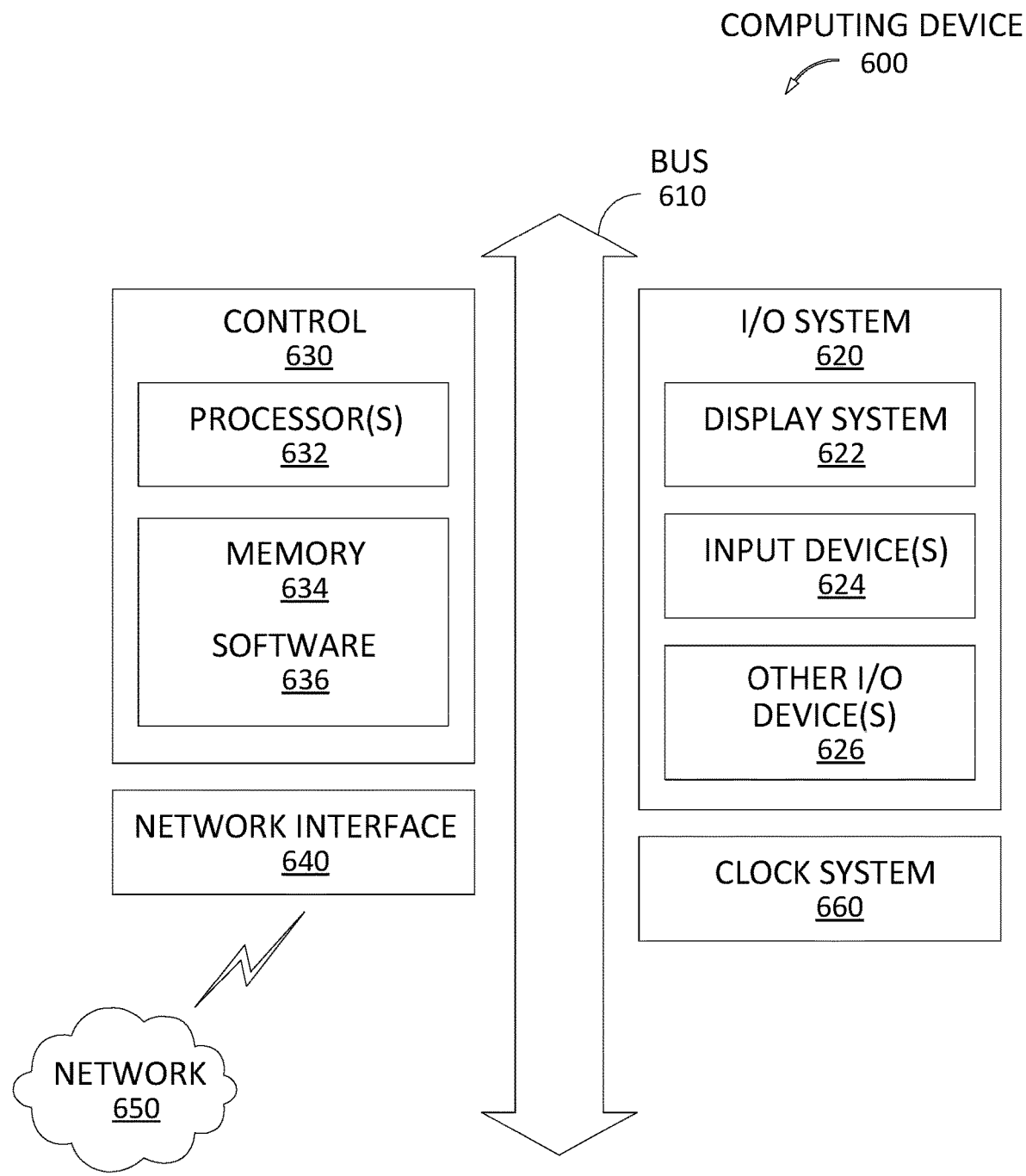
FIG. 6 depicts a block diagram illustrating an example of a processing system in which at least some operations described herein can be implemented.

FIG. 6 is a block diagram illustrating a computing device operable to implement the disclosed technology according to some embodiments of the invention. As shown, a computer 600 includes a bus 610 that is operable to transfer data between hardware components. These components include a control 630, e.g. processing system, a network interface 640, an input/output (I/O) system 620, and a clock system 660. The computing device 600 may include other components that are not shown nor further discussed for the sake of brevity. One having ordinary skill in the art will understand any hardware and software that is included but not shown in FIG. 6.

The control 630 includes one or more processors 632, e.g. central processing units (CPUs), application specific integrated circuits (ASICs), and/or field programmable gate arrays (FPGAs), and memory 634 (which may include software 636). For example, the memory 634 may include volatile memory, such as random-access memory (RAM) and/or non-volatile memory, such as read-only memory (ROM). The memory 634 can be local, remote, or distributed.

A software program, e.g. software 636, when referred to as "implemented in a computer-readable storage medium," includes computer-readable instructions stored in the memory, e.g. memory 634. A processor, e.g. processor 632, is "configured to execute a software program" when at least one value associated with the software program is stored in a register that is readable by the processor. In some embodiments, routines executed to implement the disclosed embodiments may be implemented as part of operating system (OS) software, e.g. Microsoft Windows® and Linux® or a specific software application, component, program, object, module, or sequence of instructions referred to as computer programs.

As such, the computer programs typically comprise one or more instructions set at various times in various memory devices of a computer, e.g. computing device 600, which, when read and executed by at least one processor, e.g. processor 632, will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium, e.g. memory 634.

Network interface 640 may include a modem or other interfaces (not shown) for coupling the computing device 600 to other computers over the network 650. The I/O system 620 may operate to control various I/O devices, including peripheral devices such as a display system 622, e.g. a monitor or touch-sensitive display, and one or more input devices 624, e.g. a keyboard and/or pointing device. Other I/O devices 620 may include, for example, a disk drive, printer, scanner, or the like. Lastly, the clock system 660 controls a timer for use by the disclosed embodiments.

Operation of a memory device, e.g. memory 634, such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Figure 7:
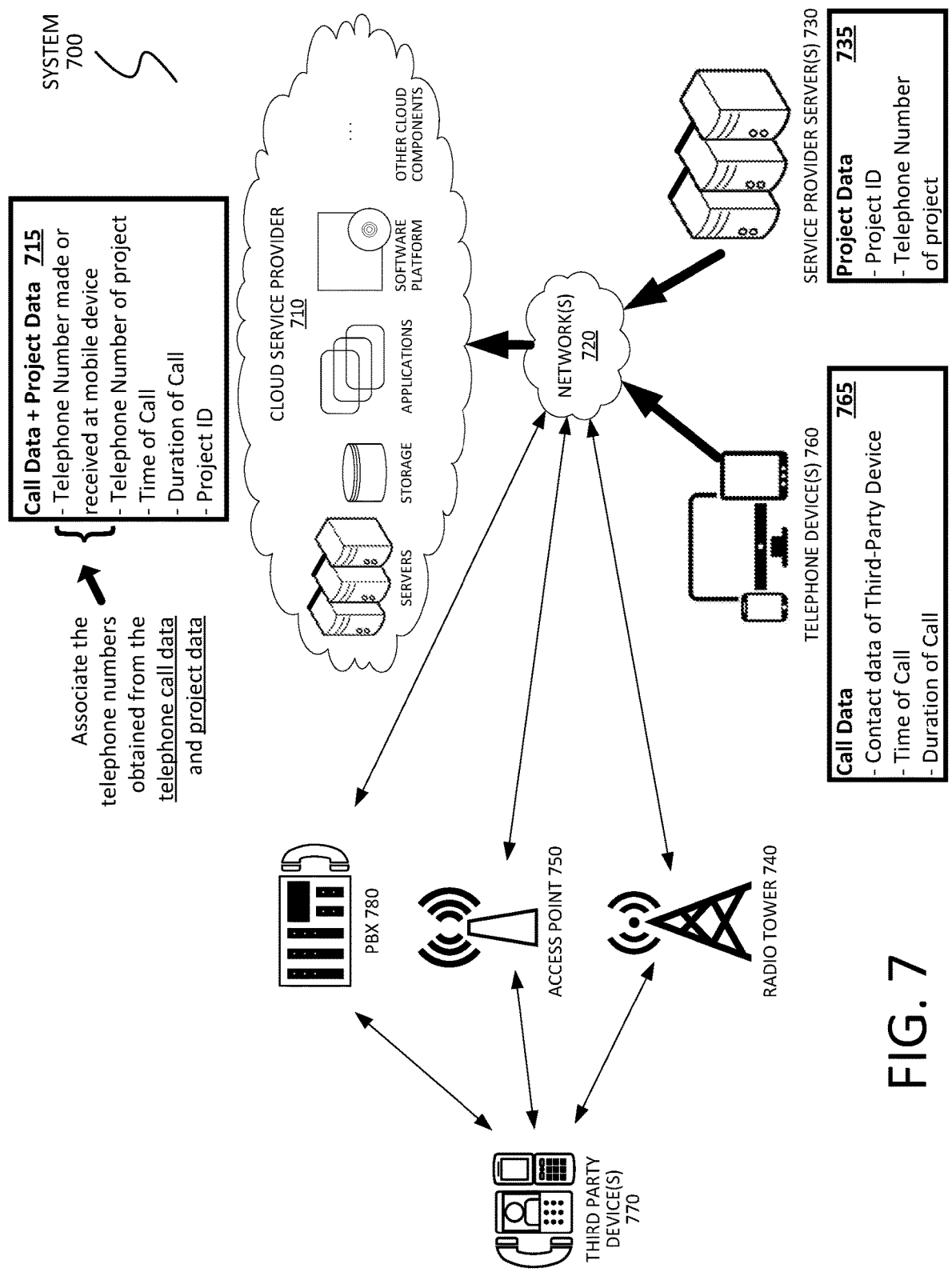
FIG. 7 depicts a block diagram illustrating a communications system according to some embodiments of the present disclosure.

FIG. 7 is a block diagram illustrating a communications system according to some embodiments of the present disclosure. As shown, the communications system 700 includes components such as cloud service provider 710, network(s) 720, service provider server(s) 730, radio tower(s) 740, access point(s) 750, telephone device(s) 760, third-party device(s) 770, and private branch exchange (PBX) 780. Cloud service provider 710 may include functionality facilitated by servers, storage, applications, software platforms, and other components. Telephone device(s) 760 may be located within a third-party worksite location 770. Additionally, telephone device(s) 760 is communicatively coupled to the network(s) 720 via access point 750, radio tower 740, or PBX 780.

Telephone device(s) 760 and/or third-party device(s) 770 may be any type of device that can communicate with a network node and/or with another device in a cellular, computer, and/or mobile communications system. The telephone device(s) 760 and/or third-party device(s) 770 may be located remotely from the cloud service provider 710. Examples of a telephone device(s) 760 and/or third-party device(s) 770 include smartphones (e.g. Apple iPhone, Samsung Galaxy, etc.), tablet computers (e.g. Apple iPad, Samsung Note, Amazon Fire, Microsoft Surface, etc.), wireless devices capable of machine-to-machine (M2M) communication, wearable electronic devices, and any other device that is capable of accessing the network(s) 720. Telephone device(s) 760 and/or third-party device(s) 770 may facilitate voice calls or video calls. Additionally, telephone device(s) 760 and/or third-party device(s) 770 may use a circuit based network or packet based network. For example, telephone device(s) 760 and/or third-party device(s) 770 may be a voice over IP device. Additionally, telephone device(s) 760 and/or third-party device(s) 770 may be a wired or wireless device. Those skilled in the art will appreciate that the disclosed embodiments may include any number of telephone devices.

Telephone device(s) 760 and/or third-party device(s) 770 may store and transmit code (composed of software instructions) and data using machine-readable media, such as non-transitory machine-readable media (e.g. machine-readable storage media such as magnetic disks, optical disks, read only memory (ROM), flash memory devices, and phase change memory), and transitory machine-readable transmission media (e.g. electrical, optical, acoustical, or other forms of propagated signals, such as carrier waves or infrared signals).

Telephone device(s) 760 and/or third-party device(s) 770 can include hardware such as one or more processors coupled to one or more other components, such as non-transitory machine-readable media to store code and/or data, user input/output (I/O) devices (e.g. a keyboard, a touchscreen, and/or a display), and network connections, e.g. an antenna, to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on processor(s) of that electronic device. One or more parts of an embodiment of the present disclosure may be implemented using different combinations of software, firmware, and/or hardware.

The telephone device(s) 760 and/or third-party device(s) 770 can be enabled to access any of the network(s) 720 by using the communications circuitry and the antenna elements as configured in accordance with the selected communications resources. Accordingly, the telephone device(s) 760 can be optimized for local service providers, bands, protocols, frequencies, and/or to comply with local laws or regulations. For example, antenna elements of the telephone device(s) 760 can be separately and/or collectively addressable to optimize access to a local wireless network. In particular, software can implement various loading and tuning routines for automatically switching the antenna elements to form various antenna types for connection to a communications network.

The radio tower 740, access point 750, and PBX 780 can be any type of network node that may communicate with telephone device(s) 760 and with another network node. The radio tower 740, access point 750, and PBX 780 may be a network device or apparatus. Examples of network access nodes include a base station, e.g. radio tower 740, an access point, e.g. access point 750, or any other type of network node such as a PBX 780, network controller, radio network controller (RNC), base station controller (BSC), a relay, transmission points, and the like. The system 700 depicts different types of radio tower 740 and access point 750 to illustrate that the telephone device(s) 760 may access different types of networks through different types of network access points. For example, a base station, e.g. radio tower 740, can provide access to a cellular telephone system of the network(s) 720. Similarly, an access point, e.g. radio tower 740, or PBX 780 provides access to network(s) 720.

The network(s) 720 may include any combination of private, public, wired, or wireless systems such as a cellular telephone network, a computer network, the Internet, and the like. Any data communicated over the network(s) 720 may be encrypted or unencrypted at various locations or along different portions of the networks. Examples of wireless systems include Wideband Code Division Multiple Access (WCDMA), High Speed Packet Access (HSPA), WiMax, Wi-Fi, Wireless Local Area Network (WLAN), and Global System for Mobile Communications (GSM), GSM Enhanced Data Rates for Global Evolution (EDGE) Radio Access Network (GERAN), and other systems that may also benefit from exploiting the scope of this disclosure.

The cloud platform 710 can provide access to a shared pool of configurable computing resources including servers, storage, applications, software platform, networks, services, and the like accessed by the service provider servers 730 to offer add-on applications to telephone device(s) 760. The cloud service provider 710 supports multiple tenants and is commonly referred to as a platform as a service (PaaS). The PaaS is provided to developers for creating the add-on applications that run on the components of the cloud service provider 710. Force.com is an example of a PaaS that hosts applications hosted on Salesforce.com, which is an example of a cloud platform. For example, add-on applications can provide subscription billing services to users using the telephone device(s) 760. The subscription billing services are provided by the service provider servers 730 and include applications built on the software platform of the cloud platform 710.

The service provider servers 730 may include any number of server computers that provide the add-on applications such as project management or customer management services. These services provide data associated with a project or customer. Data may include identification information, physical location information, and telephone number information associated with the project or customer. Although shown separately from the cloud platform 710, the service provider servers 730 may be included as part of the cloud platform 710.

The service provider servers 730 may provide or administer a user interface, e.g. website, accessible from the telephone device(s) 760. The user interface may include features such as dashboard analytics to provide insight into how a business is performing. Examples of businesses that could benefit from subscription billing services range from SaaS (Software as a Service) providers to energy and utilities companies.

The add-on applications provided by the service provider servers 730 are built using a particular programming language. For example, Force.com applications are built using Apex (a proprietary Java-like programming language for Force.com) and Visualforce (an XML syntax typically used to generate HTML). The code used to build applications may include functions that are accessible by the add-on applications.

The system 700 may use a variety of communications standards, protocols, number of frequency bands, frequencies, and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), 3rd Generation Partnership Project (3GPP) related standards, Bluetooth, Wireless Fidelity (Wi-Fi) (e.g. IEEE 802.11a, IEEE 802.11b, IEEE 802.11g and/or IEEE 802.11n), voice over Internet Protocol (VoIP), Wi-MAX, a protocol for e-mail (e.g. Internet message access protocol (IMAP) and/or post office protocol (POP)), instant messaging (e.g. extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed.

In some embodiments, the telephone device(s) 760 generates call data 765. For example, a telephone call may be established between telephone device(s) 760 and third-party device(s) 770. Telephone device(s) 760 may generate data indicating the contact information associated with the connected third-party device(s) 770. A person skilled in the art would appreciate that a telephone number, user name, or other identifier may be used in place of a telephone number. The data may also indicate the time that the telephone call was established. Similarly, the data may also indicate the duration of the established call.

In some embodiments, the service provider server(s) 730 provides project data 735. The project data 735 may include identification information indicative of a project and the contact information associated with the project. In other words, project data 735 associates a project and a contact information of the project. In some embodiments, the project may correspond to client. As noted above, a person skilled in the art would appreciate that a user name or other identifier may be used in place of a telephone number.

In some embodiments, the cloud service provider 710 associates the call data 765 with the project data 735. In particular, the cloud service provider 710 may match the contact information identified by the call data 765 with the contact information identified by the project data 735. This allows the cloud service provider 710 pull together data indicating the time and duration of a call and the project associated with the call.

In one example, a telephone call is established between telephone device(s) 760 and third-party device(s) 770. Cloud service provider 710 obtains call data 765 and identifies the contact information of third-party device(s) 770. Cloud service provider 710 then obtains project data 735 associated with the telephone number of third-party device(s) 770. The cloud service provider 710 then combines the data such that the employee ID, project ID, contact information of the third-party device(s) 770 (e.g. the telephone number associated with a project or client), and the time and duration of the telephone call. In some embodiments, project or client ID and the duration of the respective call in combined data 715 is used to generate an invoice entry. The invoice entry may be stored at cloud service provider 710, service provider server(s) 730, or telephone device(s) 760. For example, the records may be used for record keeping, auditing, or billing purposes. The data records and/or invoice entries may be created using various SaaS APIs. In one embodiment, records may be created on a SALESFORCE server using various SALESFORCE APIs.

Aspects of the invention may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While the invention has been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the invention has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the invention. All such improvements are considered within the scope of the concepts disclosed herein. Thus, the description is to be regarded as illustrative instead of limiting.

What is claimed:

1. A method comprising:
    accessing via a first application programming interface ("API") to receive one or more types of call data of a call associated with a user device, the call data including call contact data and user data configured to indicate an employee assignment associated with the user device;
    identifying at a processor of a shared pool of computing resources the one or more types of call data;
    generating a data structure associated with a stored record, the data structure being configured to store the call data by reformatting an initial data structure associated with the call data when received;
    mapping a field of the initial data structure to another field of the data structure after being generated to store call data in the stored record;
    accessing via a second application programming interface ("API") one or more types of project data associated with a project;
    matching at the processor a type of call data with a type of project data and employee data associated with the employee assignment, the call data, the project data, and the employee data being updated in the data structure of the stored record and configured to be displayed in a graphical user interface;
    generating a record as an invoice entry based on at least one type of the call data and at least one type of the project data; and
    transmitting data representing the record via the data connection to cause display of the record in the graphical user interface.

2. The method of claim 1, identifying at the processor of the shared pool of computing resources the one or more types of call data comprises:
    identifying the one or more types of call data in a multi-tenant network associated with the shared pool of computing resources.

3. The method of claim 1, wherein the first application programming interface ("API") comprises a telephony API.

4. The method of claim 1, wherein the second application programming interface ("API") comprises a software-as-a-service ("SaaS") API.

5. The method of claim 1, wherein generating the record as the invoice entry comprises:
    accessing a call data record and a project data record; and
    using data stored in the call data record and the project data record to form the invoice entry.

6. The method of claim 1, further comprising:
    creating a call data record including the type of call data.

7. The method of claim 6, wherein the call data record includes the type of call data as call time data, the call time data being indicative of the time the call was made.

8. The method of claim 6, wherein the call data record includes the type of call data as call duration data, the call duration data being indicative of the duration of the call.

9. The method of claim 6, wherein the call data record includes the type of call data indicative of contact information of the third-party device used to establish the call.

10. The method of claim 6, wherein the call data record includes the type of call data indicative of a user name.

11. The method of claim 6, wherein the call data record includes the type of call data is a telephone number.

12. The method of claim 1, further comprising:
    creating a project record including the type of project data.

13. The method of claim 12, wherein the project data record includes the type of project data indicative of the project.

14. The method of claim 12, wherein the project data record includes the type of project data is indicative of contact information associated with the project.

15. The method of claim 1, wherein the call is a telephone call established between a telephone device and a third-party device.

16. An apparatus comprising:
    a processor; and
    a memory that includes instructions which, when executed by the processor, cause the processor to:
    access via a first application programming interface ("API") to receive one or more types of call data of a call associated with a user device, the call data including call contact data and user data configured to indicate an employee assignment associated with the user device;
    identify at a processor of a shared pool of computing resources the one or more types of call data;
    generate a data structure associated with a stored record, the data structure being configured to store the call data by reformatting an initial data structure associated with the call data when received;
    mapping a field of the initial data structure to another field of the data structure after being generated to store call data in the stored record;

access via a second application programming interface ("API") one or more types of project data associated with a project;

match at the processor a type of call data with a type of project data and employee data associated with the employee assignment, the call data, the project data, and the employee data being updated in the data structure of the stored record and configured to be displayed in a graphical user interface;

generate a record as an invoice entry based on at least one type of the call data and at least one type of the project data; and transmit data representing the record via the data connection to cause display of the record in the graphical user interface.

17. The apparatus of claim 16, wherein the instructions to receive the one or more types of call data comprise the instructions to:

identify the one or more types of call data in a multi-tenant network associated with the shared pool of computing resources.

18. The apparatus of claim 16, wherein the first application programming interface ("API") comprises a telephony API.

19. The apparatus of claim 16, wherein the first application programming interface ("API") comprises a software-as-a-service ("SaaS") API.

20. The apparatus of claim 16, wherein the instructions further comprise additional instructions to:

access a call data record and a project data record; and
use data stored in the call data record and the project data record to form the invoice entry.

* * * * *